F. SHERWIN.
DRAFT BAR.
APPLICATION FILED JAN. 16, 1918.
1,272,545.
Patented July 16, 1918.
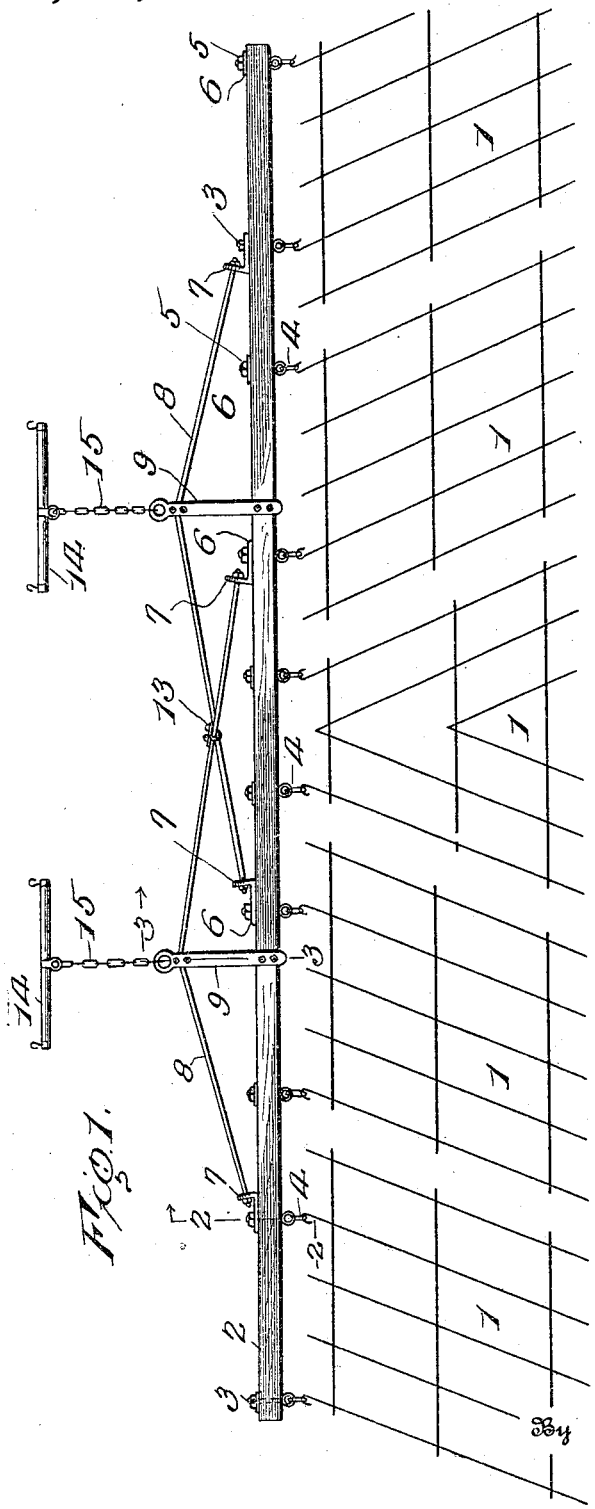
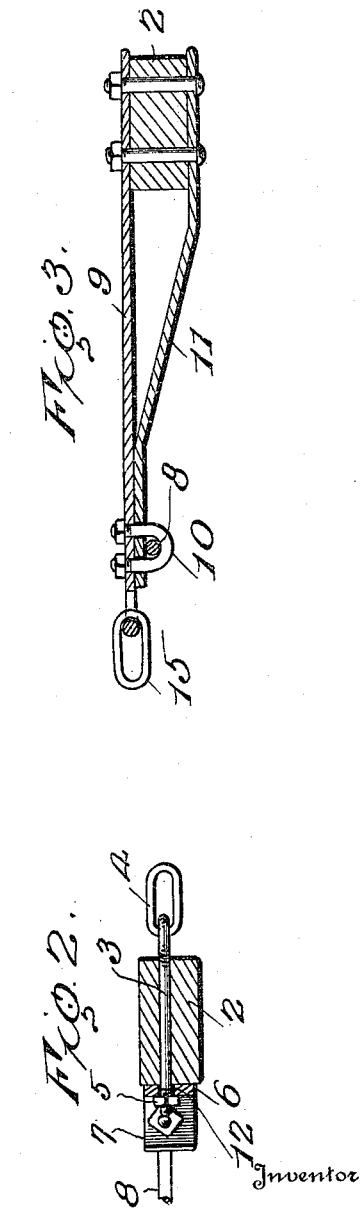
Inventor
Frank Sherwin
Attorneys.

UNITED STATES PATENT OFFICE.

FRANK SHERWIN, OF BROOKINGS, SOUTH DAKOTA.

DRAFT-BAR.

1,272,545.　　　　Specification of Letters Patent.　　Patented July 16, 1918.

Application filed January 16, 1918. Serial No. 212,008.

*To all whom it may concern:*

Be it known that I, FRANK SHERWIN, a citizen of the United States, residing at Brookings, in the county of Brookings and State of South Dakota, have invented certain new and useful Improvements in Draft-Bars, of which the following is a specification.

As now generally constructed the draft bars for wide harrows are so heavy in order to obtain the necessary strength that they are burdensome on the team and force the front end of the harrow too deeply into the ground. It is the object of my invention to provide a draft bar which will possess the maximum strength with minimum weight and combine durability and efficiency with economy of manufacture.

The invention is illustrated in the accompanying drawings in which—

Figure is a plan view of a draft bar embodying the improvements, a harrow being shown diagrammatically;

Fig. 2 is a section on the line 2—2 of Fig. 1;

Fig. 3 is a section on the line 3—3 of Fig. 1.

The harrow members 1 may be of any preferred form and construction. The draft bar 2 may be of wood or metal and, at intervals of its length, eyebolts 3 are inserted transversely through the same, the harrow members being connected with the eyes of the bolts by links 4 or other couplings and the eye-bolts being secured in position by nuts 5 fitted upon the front ends of the bolts and turned home against washers 6. Some of the washers are constructed with lugs 7 which receive the ends of truss-rods 8 and serve as anchors for said rods, the intermediate portions of the rods being carried by the front ends of posts 9 which are secured to and project forwardly from the draft bar. The truss-rods are connected to the posts by clips or U-bolts 10 which also secure to the posts the front ends of braces 11 which have their rear ends secured to the under side of the draft bar as shown clearly in Fig. 3. The washers 6 provided with the anchor lugs 7 are also provided with slots 12 whereby they may be adjusted transversely of the bolts 3 so as to put the truss bars under the proper tension, as will be readily understood, and a clip 13 is secured around the overlapping portions of the truss bars to prevent buckling of the same. The whiffletrees 14 are connected with the front ends of the draft posts 9 in any preferred manner, as by chains 15.

It will be evident from the foregoing description, taken in connection with the accompanying drawings, that I have provided an exceedingly simple device by which the pulling strain will be widely distributed and the draft bar so reinforced that it will effectually resist the strain and may be made of light material so that it will not tend to force the front end of the harrow deeply into the ground.

Having thus described the invention, what is claimed as new is:

The combination of a draft-bar, posts secured to and projecting forwardly from the draft-bar, harrow-attaching bolts mounted in the draft-bar, anchor lugs held by said bolts and adjustable laterally with respect thereto, and truss-rods secured at their ends to the anchor lugs and intermediate their ends to the ends of the posts.

In testimony whereof I affix my signature.

FRANK SHERWIN.

Copies of this patent may be obtained for five cents each, by addressing the "Commissioner of Patents, Washington, D. C."